United States Patent

Schmid

Patent Number: 5,328,120
Date of Patent: Jul. 12, 1994

[54] SAFETY BELT RETRACTOR

[75] Inventor: Johannes Schmid, Schwäbisch Gmünd-Hussenhofen, Fed. Rep. of Germany

[73] Assignee: TRW Repa GmbH, Alfdorf, Fed. Rep. of Germany

[21] Appl. No.: 28,376

[22] Filed: Mar. 9, 1993

[30] Foreign Application Priority Data

Mar. 10, 1992 [DE] Fed. Rep. of Germany ....... 4207579

[51] Int. Cl.$^5$ ............................................. B60R 22/34
[52] U.S. Cl. ............................................ 242/382.4
[58] Field of Search ............... 242/107.4 R, 107.4 A, 242/107.4 B, 107.4 D; 280/806; 297/478, 480

[56] References Cited

U.S. PATENT DOCUMENTS

| | | | |
|---|---|---|---|
| 4,726,539 | 2/1988 | Schmidt et al. | 242/107.4 A |
| 4,749,143 | 6/1988 | Tsukamoto et al. | 242/107.4 R |
| 4,809,926 | 3/1989 | Koike | 242/107.4 R |
| 4,811,912 | 3/1989 | Takada | 242/107.4 R |

FOREIGN PATENT DOCUMENTS 3809007 10/1988 Fed. Rep. of Germany.
2125960 9/1972 France.

*Primary Examiner*—John M. Jillions
*Attorney, Agent, or Firm*—Tarolli, Sundheim & Covell

[57] ABSTRACT

The safety belt retractor includes an automatic blocking mechanism for securing a child's seat in the vehicle. A reduction gearing (24, 28, 30, 34, 38; 74, 78, 88) having a worm wheel (28, 78) reduces the belt reel rotation on transmission to a cam gear wheel (38; 88) rotatably mounted in the retractor frame (10) remote from the belt reel. On rotation of the belt reel, the cam gear wheel performs at the most one revolution. On further withdrawal of webbing, the cam member (42; 92) of the cam gear wheel (38; 88) tips a rocking lever (46; 96) which thereupon initiates a blocking of the belt reel against rotation in the direction of the webbing withdrawal. After a substantially complete winding back on of the webbing, the blocking is released again. The system is compact, easy to mount and can be set to various switch-over points by replacing only one component, i.e. the cam gear wheel.

7 Claims, 6 Drawing Sheets

SAFETY BELT RETRACTOR

The present invention relates to a safety belt retractor of the automatic locking type for vehicles, i.e. a retractor wherein uncoiling of a predetermined webbing length from the reel causes a blocking of the belt reel against further rotation in the direction of the webbing withdrawal, and recoiling of a predetermined webbing length effects a cancellation of the reel blocking function. The automatic locking feature, as opposed to the usual vehicle-sensitive or belt-sensitive blocking function, is required for safe securing of a child's seat or also to secure loads in the vehicle. The blocking is effected by pulling the safety belt out more than the withdrawal length usually required when fastening the belt. Thereafter, the belt is coiled up by the take-up spring of the belt retractor until the belt slack has been eliminated, but cannot be pulled out from the retractor until the belt has been almost completely wound up again.

In a known safety belt retractor shown in German Patent No. 3,809,007, the rotation of the belt reel is transmitted to a planetary gearing which is arranged axially with the belt reel and the planet wheel of which has a projection which in predetermined positions radially displace a respective push member driving the rocking lever. Since the components of a planetary gearing are matched in a specific manner, these positions are fixedly predetermined and not variable without fundamental modifications. Moreover, on installation it must be ensured that the planet wheel is inserted not only with the correct alignment of the projection but also at the correct position of the planetary gearing because otherwise no switch-over points will arise or they will be completely incorrect. Furthermore, the components required for incorporating the automatic blocking function in this retractor require considerable space in the axial direction of the belt reel and consequently cannot generally be integrated into existing belt retractors with predetermined dimensions.

The present invention provides a safety belt retractor with a conventional vehicle-sensitive and/or belt-sensitive blocking function, and with an additional automatic blocking function which is easily integrated into an existing retractor design, which is simple to assemble and adjustable to various switch-over points of the system by exchange of only one component.

According to the invention, a safety belt retractor is provided which comprises a frame, a reel rotatably mounted in the frame for coiling and uncoiling of belt webbing, an at least vehicle-sensitive blocking mechanism for blocking rotation of said reel, a control disc mounted for limited relative rotation with respect to said reel, and a gear wheel connected to said reel for joint rotation. The control disc carries peripheral control teeth, and a control pawl is pivotally mounted for movement between a first position engaged with the control teeth to stop rotation of the control disc and a second position disengaged from the control teeth. Relative rotation between the reel and the control disc causes the blocking mechanism to be activated. The control pawl is driven between its first and second positions by rotation of the gear wheel through a reduction gear. The reduction gear comprises a worm wheel and the control pawl is pivotally mounted with respect to the frame. Preferably, the reduction gear comprises a cam gear wheel which is rotatable mounted in the frame and which carries a cam adapted to engage the control pawl for pivotal movement thereof between said first and second positions.

In a particularly preferred embodiment, the reel has integrally formed peripheral blocking teeth, and a blocking pawl is pivotally mounted in the frame for selective blocking engagement with the blocking teeth. The blocking mechanism comprises a control lever engaging the blocking pawl for moving the pawl into an engaged position in response to relative rotation between the reel and the control wheel.

In contrast to the known planetary gearings, it is not necessary to arrange the components of the automatic blocking feature on the belt reel shaft; instead, there are numerous possibilities of integrating the components for the automatic blocking in space-saving manner into existing systems. In particular, all required components can be arranged in the region of the vehicle-sensitive blocking mechanism but still within the maximum radius of the belt coil at a point at which free space is very frequently available in any case. The use of a worm wheel permits, with a very low number of components, a reduction sufficing to ensure that the cam gear wheel on webbing withdrawal performs at the most one revolution between the first and second position of the control pawl. The switch-over points of the automatic blocking function are variable by exchanging a single component, that is by replacing the cam gear wheel by one with a different cam configuration.

Further features and advantages of the invention will be apparent from the following description of two embodiments and from the drawings, to which reference is made. The drawings show, in some cases in section and in some cases in plan view, with omission of parts not necessary for clarity:

Figure 1:
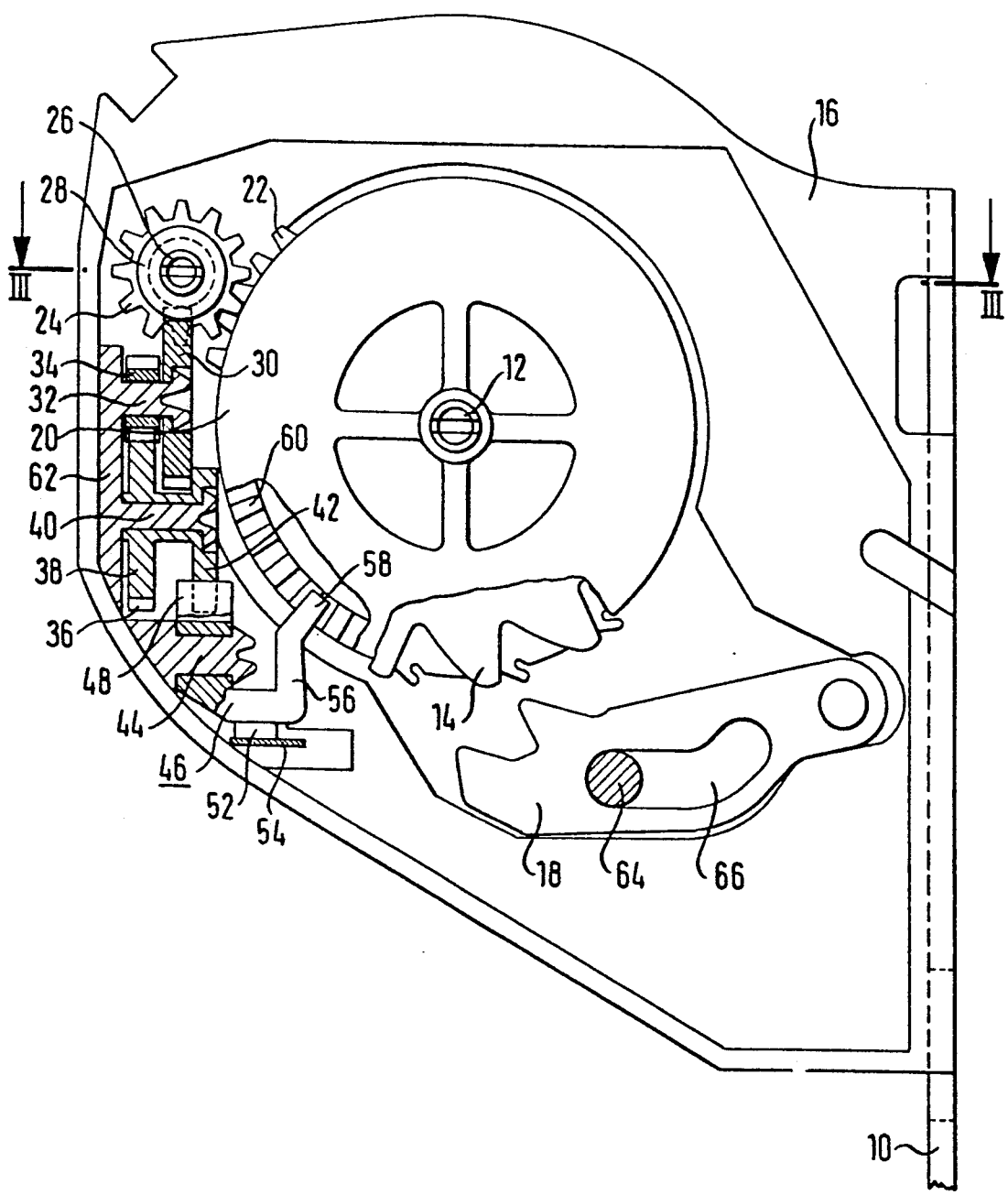
FIG. 1 is a side view of a first embodiment of the safety belt retractor.
Figure 2:
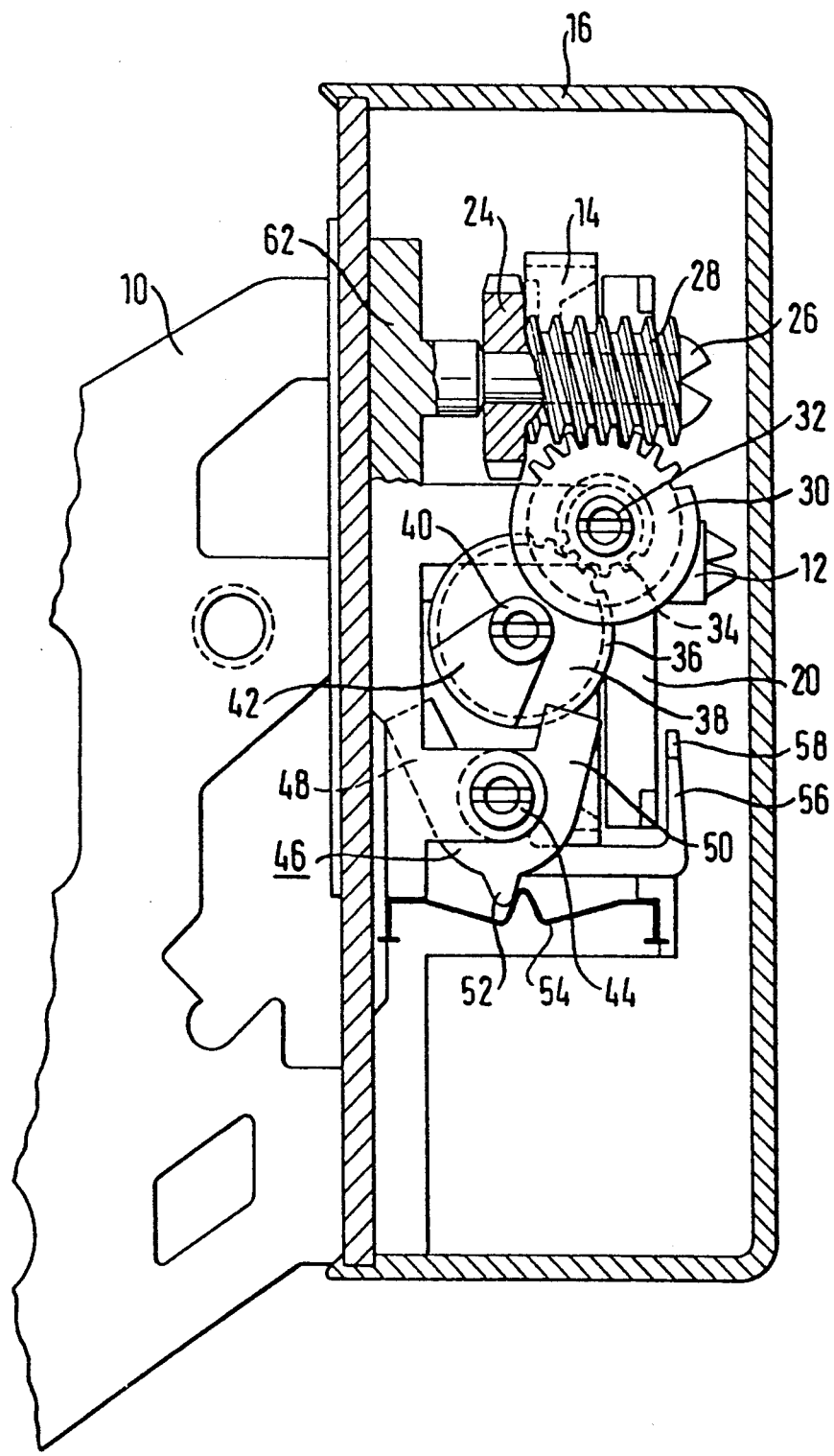
FIG. 2 shows the embodiment according to FIG. 1 along a line II—II of FIG. 1, from the left.
Figure 3:
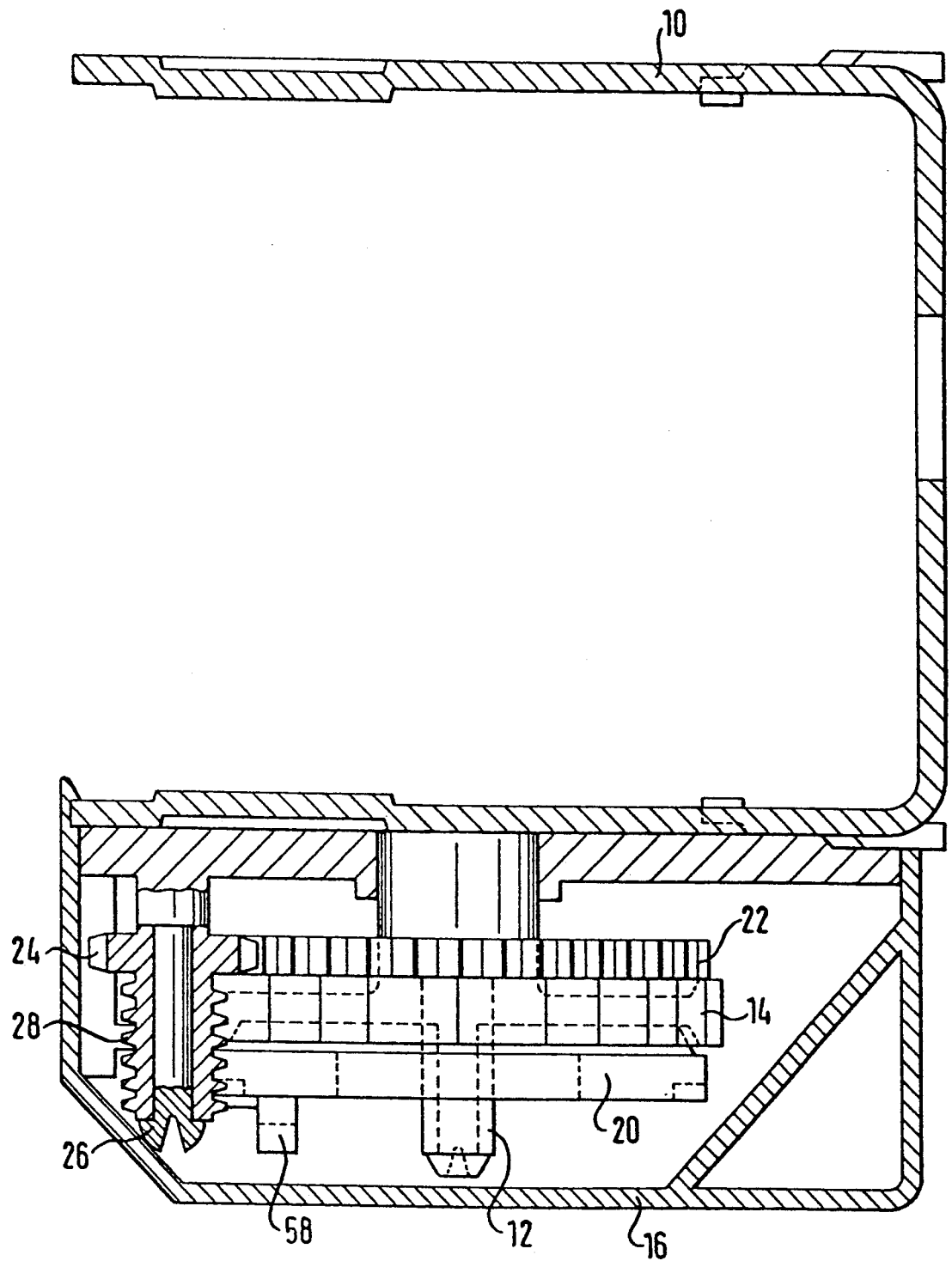
FIG. 3 shows the embodiment according to FIG. 1 along a line III—III of FIG. 1, from above.

Common to the two embodiments shown in FIGS. 1, 2 and 3 as well as 4, 5 and 6 is that in a U-shaped belt retractor frame 10 a belt reel for webbing, not illustrated, is mounted. Of the belt reel, in FIGS. 1 and 4 only one end of the belt reel shaft 12 and an angular fragment of integrally formed blocking tooth 14 thereof are shown. In the remaining Figures the belt reel has been completely omitted. In an extension of the belt reel shaft 12, on one leg of the frame 10 a control housing 16 is mounted in which generally known elements are accommodated for vehicle-sensitive and webbing-sensitive blocking of the belt reel. Of these elements, a blocking pawl 18 pivotally mounted on the frame 10 and a control disc 20 are shown. The control disc 20 is mounted on the belt reel shaft 12 and due to its own inertia or by response of a vehicle-sensitive deceleration sensor, not illustrated, can lag with respect to a rotation of the belt reel, the blocking pawl 18 dipping in known manner into the blocking toothing 14 of the belt reel. Arranged on the belt shaft 12 between the belt reel and the control disc 20 is a gear 22 which is non-rotatably connected to the belt reel and has substantially the radius of the control disc 20. The gear 22 may also be formed by external toothing of a suitable rotary member present in any case at this point.

In the embodiment according to FIGS. 1 to 3, a smaller gear 24 axially offset with respect to the gear 22 engages into the latter, said gear 24 being mounted on a shaft 26 offset parallel to the belt reel shaft 12. The gear 24 is integrally connected to a worm wheel 28 aligned coaxial therewith. A gear 30 mounted on a shaft 32 extending transversely of the shaft 26 meshes with the worm wheel 28. A pinion 34 is attached coaxially and integrally to the gear 30 and engages into an outer toothing 36 of a cam gear wheel 38. The cam gear wheel 38 is mounted on a shaft 40 which extends parallel to the shaft 32. The cam gear wheel 38 continues integrally towards the interior of the frame and finally widens radially to a circular sector-like cam member 42.

A rocking lever 46 is mounted on a shaft 44 extending parallel to the shafts 32 and 40. The rocking lever 46 comprises two arms 48, 50 projecting into the outer radius of the cam member 42 and a nose 52 directed in the opposite direction. An over-center spring 54 engages the nose 52 and urges the rocking lever 46 either into a first position in which it initiates a blocking of the belt reel against rotation in the direction of the belt withdrawal, or into a second position turned through a few degrees in clockwise direction and shown in FIG. 2, in which it effects a cancellation of the belt reel blocking, an unstable dead-point position existing between the two positions due to the spring action and a bend in the over-center spring 54. The rocking lever 46 further carries a blocking arm 56, the tip 58 of which is disposed in the second position at a distance from the control disc 20 and which in the blocking position engages into a detent toothing 60 on the control disc 20 illustrated only in an angle fragment.

The shafts 26, 32, 40 and 44 are formed integrally as unilaterally integrally formed projecting pins of a common housing-fixed carrier plate 62. The shafts 26, 32, 40 and 44 are slit and their ends widened so that the rotatable components can be simply clipped on. The over-center spring 54 is also mounted on the carrier plate 62. Consequently, the reduction gearing, the rocking lever and the over-center spring of the embodiment according to FIGS. 1 to 3 form an assembly which can be individually prefabricated and secured to the frame 10 as a whole, with corresponding assembly advantages.

Figure 4:
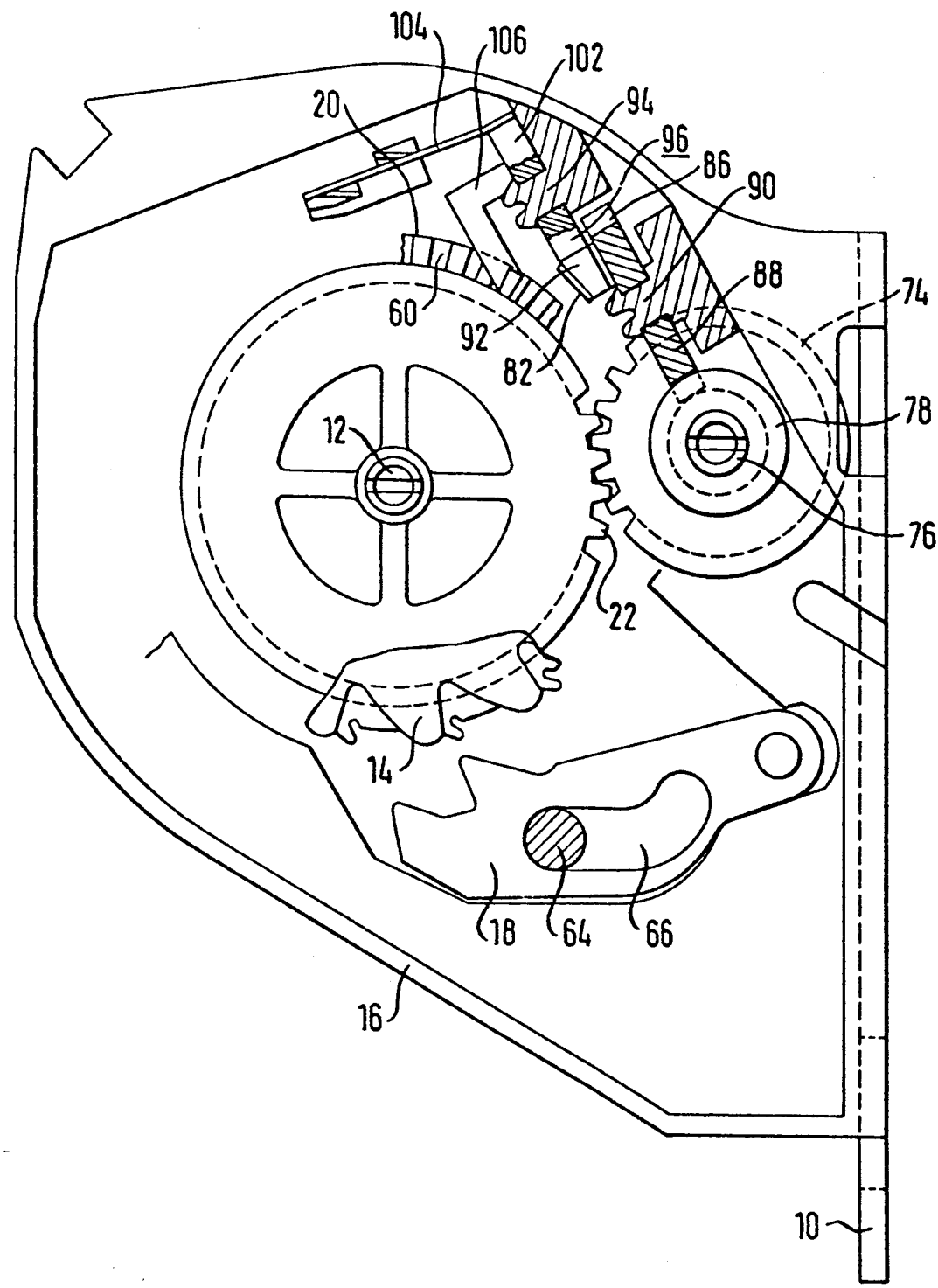
FIG. 4 shows a side view of a second embodiment of the safety belt retractor.

The blocking means described operates as follows: The rotation of the gear 22 is reduced via the gear 24, the worm wheel 28, the gear 30, the pinion 34 and the cam gear wheel 38 to such an extent that the cam gear wheel 38 executes less than one revolution on substantial withdrawal of the webbing. In the respective end positions the rocking lever 46 is flipped over by the suitably configured cam member 42. In the first position the tip 58 of the blocking arm 56 engaging the control disc 20 prevents rotation thereof, so that the relative rotation occurring on slight belt withdrawal between the belt reel and the gear 22 pivots a control lever 64 mounted on the belt reel shaft 12 in known manner. In FIGS. 1 and 4, all that can be seen of the control lever 64 is the part which engages into a recess 66 in the blocking pawl 18 and brings the blocking pawl 18 into engagement with the blocking toothing 14 of the belt reel, thereby making further belt withdrawal impossible.

Figure 5:
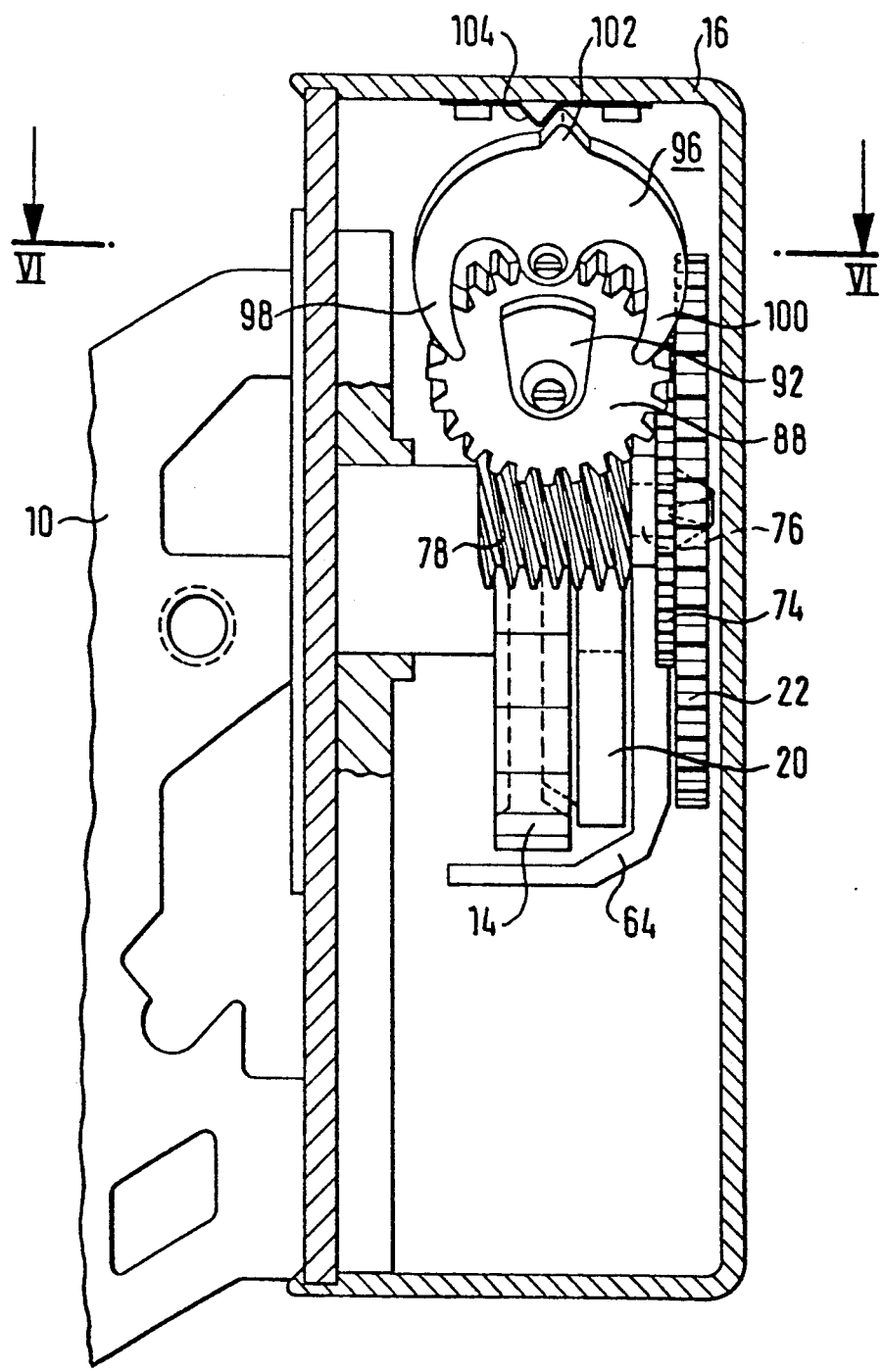
FIG. 5 shows the embodiment according to FIG. 4 along a line V—V of FIG. 4, from the left.
Figure 6:
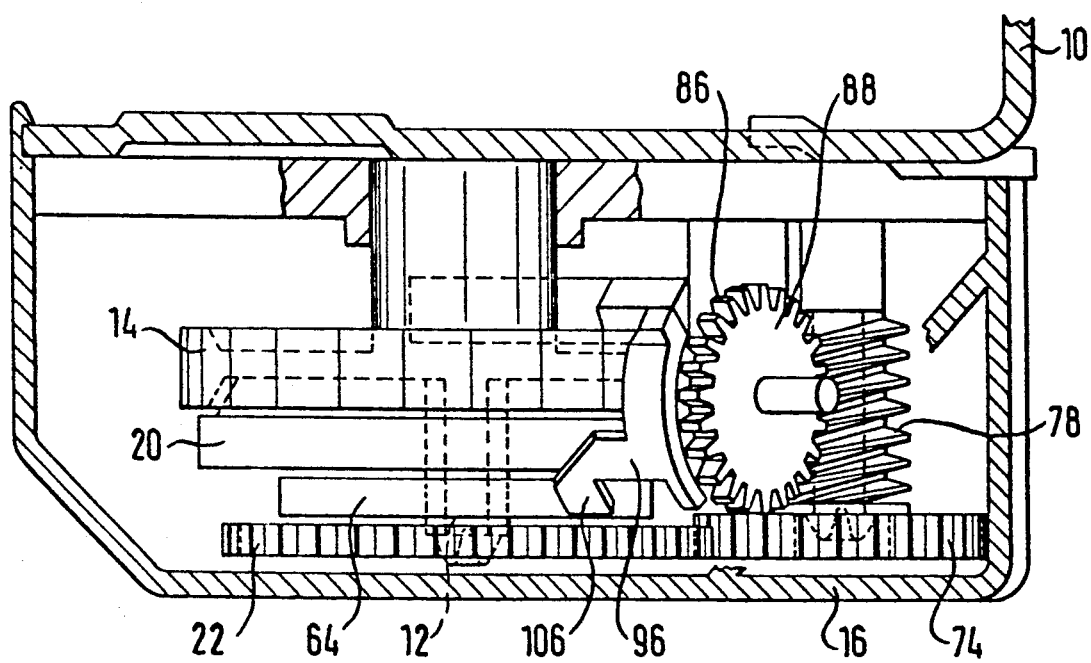
FIG. 6 shows the embodiment according to FIG. 4 along a line VI—VI of FIG. 5, from above.

The embodiment according to FIGS. 4 to 6 differs from the embodiment described above substantially in that the automatic blocking mechanism is accommodated at a different location in the control housing 16, illustrating the flexibility of the mechanism as regards installation in different safety belt retractor designs, and in that no element corresponding to the gear-pinion combination 30, 34 is needed. Elements corresponding to the embodiment described above are provided with the same reference numerals and the other elements comparable in their function are provided with reference numerals increased by 50.

A smaller gear 74 offset axially with respect to the gear 22 engages into the latter and is mounted on a shaft 76 offset and parallel to the belt reel shaft 12. The gear 74 is integrally connected to a worm wheel 78 extending coaxially thereto. Meshing with the worm wheel 78 is a cam gear wheel 88 which is provided with an outer toothing 86 and is mounted on a shaft 90 fixed with respect to the control housing and has a circular sector-like cam member 92. A rocking lever 96 shown only partially in each of FIGS. 5 and 6 is mounted on a shaft 94 parallel to the shaft 90. The rocking lever 96 comprises two arms 98, 100 projecting into the outer radius of the cam member 92 and a nose 102 directed in the opposite direction. As in the embodiment previously described, a dead-point spring 104 engages the nose 102. The rocking lever 96 further carries a blocking arm 106, the tip of which can engage into the detent toothing 60 on the control disc 20. Although not immediately apparent from the drawings, in this embodiment as well several mechanism elements are arranged on a common carrier plate.

What is claimed is:

1. A safety belt retractor for vehicles, comprising a frame, a reel rotatably mounted in said frame for coiling and uncoiling of belt webbing, a blocking mechanism for blocking rotation of said reel, a control disc mounted for limited relative rotation with respect to said reel, a gear wheel connected to said reel for joint rotation, said control disc carrying peripheral control teeth, and a blocking arm being pivotally mounted for movement between a first position engaged with said control teeth to stop rotation of said control disc and a second position disengaged from said control teeth, relative rotation between said reel and said control disc causing said blocking mechanism to be activated, and wherein said blocking arm is driven between its first and second positions by rotation of said gear wheel through a reduction gear, said reduction gear comprising a worm wheel and said blocking arm being pivotally mounted with respect to said frame.

2. The safety belt retractor of claim 1, wherein said reduction gear comprises a cam gear wheel which is rotatably mounted in said frame and which carries a cam adapted to engage said blocking arm for pivotal movement thereof between said first and second positions.

3. The safety belt retractor of claim 2, wherein said worm wheel is connected to a spur gear for joint rotation therewith, said spur gear being in meshing engagement with said gear wheel connected to said reel, and said worm wheel being in meshing engagement with a gear member drivingly connected to said cam gear wheel.

4. The safety belt retractor of claim 1, wherein a carrier plate mounted in said frame is provided with a plurality of projecting pins for rotatably mounting components of said reduction gear.

5. The safety belt retractor of claim 1, wherein said reel has integrally formed peripheral blocking teeth and a blocking pawl is pivotally mounted in said frame for selective blocking engagement with said blocking teeth, and said blocking mechanism comprising a control lever engaging said blocking pawl for moving said pawl into an engaged position in response to relative rotation between said reel and said control disc.

6. The safety belt retractor of claim 1, wherein said blocking arm is provided on a rocking lever which has two arms projecting into a path followed by said cam on said cam gear wheel upon rotation thereof.

7. The safety belt retractor of claim 6, wherein said rocking lever is selectively held in one of two stable positions by an over-center spring.

* * * * *